(12) United States Patent
Crysel et al.

(10) Patent No.: US 7,979,302 B2
(45) Date of Patent: Jul. 12, 2011

(54) REPORT GENERATION METHOD AND SYSTEM

(75) Inventors: Kirsten S. Crysel, Kennesaw, GA (US); Lori Kay Simonson, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 1158 days.

(21) Appl. No.: 11/550,046

(22) Filed: Oct. 17, 2006

(65) Prior Publication Data
US 2008/0091485 A1    Apr. 17, 2008

(51) Int. Cl.
*G06Q 90/00* (2006.01)
(52) U.S. Cl. ...................................... 705/7.39
(58) Field of Classification Search ............... 705/7, 10
See application file for complete search history.

(56) References Cited

U.S. PATENT DOCUMENTS

| | | | |
|---|---|---|---|
| 6,581,071 B1 | 6/2003 | Gutsman et al. | |
| 6,795,828 B2 | 9/2004 | Ricketts | |
| 6,877,034 B1 * | 4/2005 | Machin et al. | 709/223 |
| 7,337,142 B1 * | 2/2008 | Holmes et al. | 705/39 |
| 7,711,595 B2 * | 5/2010 | Dickerson, Jr. | 705/10 |
| 2002/0052774 A1 | 5/2002 | Parker et al. | |
| 2004/0039619 A1 * | 2/2004 | Zarb | 705/7 |
| 2004/0073441 A1 * | 4/2004 | Heyns et al. | 705/1 |
| 2004/0128183 A1 | 7/2004 | Challey et al. | |
| 2005/0193333 A1 | 9/2005 | Ebert | |
| 2005/0222945 A1 * | 10/2005 | Pannicke et al. | 705/39 |
| 2005/0262014 A1 * | 11/2005 | Fickes | 705/38 |
| 2006/0010058 A1 * | 1/2006 | D'Hers et al. | 705/35 |

OTHER PUBLICATIONS

Alinean, Inc., Alinean Peer Comparison Data Sheet (2005).*
Rich, Alan & Allison Guidette, "PeerMonitor: Real-time Business and Competitive Intelligence" (Mar. 8, 2006).*

* cited by examiner

*Primary Examiner* — Beth V Boswell
*Assistant Examiner* — Neil R Kardos
(74) *Attorney, Agent, or Firm* — Schmeiser, Olsen & Watts; John R. Pivnichny (57) ABSTRACT

A report generation method and system. The system comprises a computing system comprising data. The computing system presents a first list comprising process categories for a plurality of processes. The computing system receives first selection of a process category from the first list. The computing system presents a second list comprising peer group options associated with the process categories. The computing system receives a second selection of at least one peer group option from the second list. The computing system retrieves a portion of from the data. The portion is associated with the first selection and the second selection. The computing system calculates a plurality of values for attributes associated with the first selection and the second selection. The computing system generates a report comprising the plurality of values.

16 Claims, 10 Drawing Sheets

4.2 Procure material and services

4.2.1 Develop scuring strategies

4.2.1.1 Develop procurement plan
        4.2.1.2 Clarify purchasing requirements
        4.2.1.3 Match needs to supply capabilities
        4.2.1.4 Analyze company's spend profile
        4.2.1.5 Seek opportunities to improve efficiency and value     4.2.2 Select suppliers and develop/maintain contracts         4.2.2.1 Identify suppliers
        4.2.2.2 Certify and validate suppliers
        4.2.2.3 Negotiate contracts
        4.2.2.4 Manage contracts     4.2.3 Order materials and services         4.2.3.1 Process/review requisitions
        4.2.3.2 Approve requesitions
        4.2.3.3 Solicit/track vendor quotes
        4.2.3.4 Create/distribute purchase order
        4.2.3.5 Expedite orders and satisfy inquiries
        4.2.3.4 Create/distribute purchase orders
        4.2.3.5 Expedite orders and satisfy inquiries     4.2.4 Appraise and develop suppliers         4.2.4.1 Monitor/manage supplier information
        4.2.4.2 Prepare/analyze spending and vendor performance
        4.2.4.3 Support inventory and production processes

Peer Group Filters

| Add one peer group filter |

Select a peer group type: [Select one.... ▾]  62

Select peer group:
- Select one....
- Industry
- Region
- Business Site Revenue
- Business Site Cost of Con....
- Total annual number of PO....
- Market conditions
- Strategy
- Role for ordering materi....
- System used to order ma....

68a (Search)

Peer Group Filters

| Add one peer group filter |

Select a peer group type: [Industry ▾]

Select peer group:
- Select one
- Goverment/Ex..
- Goverment/Jus..
- Goverment/Nat..
- Goverment/Rublic..
- Manufacturing/All
- Manufacturing/Aerospace Pr..
- Manufacturing/Bev..
- Manufacturing/Chem..
- Manufacturing/Comp..
- Manufacturing/Electr..
- Manufacturing/Fabr..

64

68b (Search)

Benchmark Wizard

Category – 4.2.3. Order Materials and Services [Change...] ⟵ 77

| Measures | Business drivers | Leading practice statements | Process maps |

Your Selections

Currency: Euro{1.76US Dollars=1 Euro} [Reset to Dollars] [Change...] ⟵ 78
Peer Group Filters: [Add/Change...] [Remove All]
Industry: Manufacturing [Remove]

| Cost Measures | Site count | Median | Benchmark |
|---|---|---|---|
| Total cost of the process "order materials/services" per one thousand Euro revenue. | 45 | E2.13 | E0.71 |
| Total cost of the process "order materials/services" per one thousand Euro purhase. | 46 | E3.26 | E1.20 |
| Total cost of the process "order materials/services" per one thousand Euro cost of... | 45 | E3.00 | E1.47 |
| Total cost of the process "order materials/services" per purchase order. | 42 | E18.43 | E7.83 |
| Total cost of the process "order materials/services" per purchase order line item | 41 | E5.13 | E1.15 |
| Personnel cost(including benefits) of the process "order materials/services" per... | 79 | E1.08 | E0.40 |
| Personnel cost(including benefits) of the process "order materials/sevices" per... | 89 | E2.15 | E0.85 |
| Personnel cost(including benefits) of the process "order materials/sevices" per... | 75 | E2.01 | E0.87 |
| Average personnel cost per FTE for the process "order materials/services. | 90 | E27.971 | E18.625 |
| Systems cost of the process "order materials/services" per one hundred thousand Euro revenue | 58 | E21.93 | E4.99 |
| Systems cost of the process "order materials/services" per one hundred thousand Euro purchases. | 68 | E28.67 | E6.05 |
| Systems cost of the process "order materials/services" per one hundred thousand Euro cost of... | 55 | E33.48 | E7.92 |

| Cycle Time Measures | Site count | Median | Benchmark |
|---|---|---|---|
| Cycle time in hours to place purchase order. | 881 | 1.00 | 0.30 |

| Efficiency and Quality Measures | Site count | Median | Median |
|---|---|---|---|
| Number of FTEs for the process "order materials/services" per one billion Euro revenue. | 813 | 79.20 | 27.08 |
| Number of FTEs for the process "order materials/services" per one billion Euro purchases. | 771 | 190.08 | 61.03 |
| Number of FTEs for the process "order materials/services" per one billion Euro cost of contin... | 145 | 68.18 | 30.49 |

Benchmark Wizard

Search Results

Category – 4.2.3. Order Materials and Services [Change...]

| Measures | Business drivers | Leading practice statements | Process maps |
|---|---|---|---|

Your Selections

Currency: Euro {1.76US Dollars=1 Euro} [Reset to Dollars] [Change...]
Peer Group Filters: [Add/Change...] [Remove All]
Industry: Manufacturing [Remove]

| Business Driver | All Companies | Your Selection |
|---|---|---|
| Personnel Cost | 68.6% | 72.3% |
| System Cost | 11.6% | 10.3% |
| Overhead Cost | 15.5% | 12.9% |
| Other Cost | 2.3% | 1.9% |
| Outsourced Cost | 2.1% | 2.6% |
| Decision Cost | 10.4% | 9.8% |
| Transaction Cost | 73.3% | 73.6% |
| Control | 6.1% | 4.9% |
| Management | 10.3% | 11.6% |
| Management activities | 10.3% | 11.6% |
| Process/review requisitions | 15.35 | 14.2% |
| Approve requisitions | 6.1% | 4.9% |
| Solicit/track vendor quotes | 10.4% | 9.8% |
| Create/distribute purchase orders | 21.3% | 20.4% |
| Expedite orders and satisfy inquiries | 15.4% | 17.2% |
| Record receipt of goods | 11.1% | 10.1% |
| Research/resolve exeptions | 10.2% | 11.8% |
| Number of approvals required for purchase order with values less than $1,000 US Dollars. | 1.00 | 1.00 |
| Number of approvals required for purchase order with values less than $1,001–$10,000 US Dollars. | 1.00 | 1.00 |

Distribution of the total cost of the process"order materials/services" by individual cost element.

Value analysis of FTE activity for the process" order materials/services.

Activity analysis of FTEs for the process" order materials/services.

FIG. 8

Benchmark Wizard

Search Results

Category – 4.2.3. Order Materials and Services[Change...]

| Measures | Business drivers | Leading practice statements | Process maps |
|---|---|---|---|

- Simplify the procurement process to free up buyers to tackle strategic issues.
- Invest in technology to enable electronic placement of PO's.
- Standardize functions across the entire purchasing organization to gain economies of sale. ←85
- Initiate supplier-managed inventory to increase efficiency. [What are leading practices?]
- Implement a well documented procurement policy to ensure consistent execution by employees.

Simplify the procurement process to free up buyers to tackle strategic issues.

Leading organizations are simplifying their procurement process to free up their buyers to have more time make...
Source: Higgins, Lisa. by the numbers: Procurement, Housten: APQC, 2005

Case Studies
National Instruments

On the desktopf of global and reginal commonity managers at National Instruments each week appears a dashboard... toward its goals in six areas. The display is color-coded like a traffic light--red for stop, yellow for caution and green for ... to take action on issues related to lead- time, inventory, material shortages, supplier count, prices or quality.These... by $10 million. With the data, the team consolidated the supplier base, moving some part numbers to better performing... inventory for some items. They increased minimum order quantities and purchased parts in bigger sized lots.

Source: (Avery, Susan Purchasing, 133, 2, 31(4) Feb 5, 2004 ISSN: 0033-4448 Language: English)
[Contributed by APQC.]

TRW

For Denise Clarkson, director of purchasing, advanced sourcing, plocurement organization. spend visibility throughout the auto supplier's entire global procurement organization.
Source: (Verespej, Mike Purchasing, 134,4,19(3) March 32005c ISSN:0033-4448 Language: English 87 (arrow pointing to Process maps tab)

REPORT GENERATION METHOD AND SYSTEM

FIELD OF INVENTION

The present invention relates to a system and associated method for generating reports on demand for a user.

BACKGROUND OF THE INVENTION

Selecting suitable criteria for generating business related documents typically requires a series of steps that may be complicated and inaccurate. Accordingly, there exists a need in the art to overcome the deficiencies and limitations described herein above.

SUMMARY OF THE INVENTION

The present invention provides a report generation method within a computing system, said computing system comprising a memory device, said memory device comprising data, said method comprising:

presenting, by said computing system to a user of said computing system, a first list comprising process categories for a plurality of processes;

receiving, by said computing system from said user, a first selection of a process category from said first list;

presenting, by said computing system to said user, a second list comprising peer group options associated with said process categories;

receiving, by said computing system from said user, a second selection of at least one peer group option from said second list;

retrieving, by said computing system, a portion of data from said data, said portion of data associated with said first selection and said second selection;

calculating, by said computing system, a plurality of values for attributes associated with said first selection and said second selection, said calculating based on said portion of data;

generating, by said computing system, a report comprising said plurality of values; and printing or displaying, by said computing system, said report.

The present invention provides a computing system comprising a processor coupled to a computer-readable memory unit, said memory unit comprising data and instructions that when executed by the processor implement a report generation method, said method comprising:

presenting, by said computing system to a user of said computing system, a first list comprising process categories for a plurality of processes;

receiving, by said computing system from said user, a first selection of a process category from said first list;

presenting, by said computing system to said user, a second list comprising peer group options associated with said process categories;

receiving, by said computing system from said user, a second selection of at least one peer group option from said second list;

retrieving, by said computing system, a portion of data from said data, said portion of data associated with said first selection and said second selection;

calculating, by said computing system, a plurality of values for attributes associated with said first selection and said second selection, said calculating based on said portion of data;

generating, by said computing system, a report comprising said plurality of values; and printing or displaying, by said computing system, said report.

The present invention provides a computer program product, comprising a computer usable medium comprising a computer readable program code embodied therein, said computer readable program code comprising an algorithm adapted to implement a report generation method within a computing system, said computing system comprising data, said method comprising:

presenting, by said computing system to a user of said computing system, a first list comprising process categories for a plurality of processes;

receiving, by said computing system from said user, a first selection of a process category from said first list;

presenting, by said computing system to said user, a second list comprising peer group options associated with said process categories;

receiving, by said computing system from said user, a second selection of at least one peer group option from said second list;

retrieving, by said computing system, a portion of data from said data, said portion of data associated with said first selection and said second selection;

calculating, by said computing system, a plurality of values for attributes associated with said first selection and said second selection, said calculating based on said portion of data;

generating, by said computing system, a report comprising said plurality of values; and printing or displaying, by said computing system, said report.

The present invention provides a process for integrating computing infrastructure, comprising integrating computer-readable code into a computer system, wherein the computer system comprises a computer usable medium, wherein said computer usable medium comprises data, and wherein the code in combination with the computer system is capable of performing a report generation method comprising:

presenting, by said computing system to a user of said computing system, a first list comprising process categories for a plurality of processes;

receiving, by said computing system from said user, a first selection of a process category from said first list;

presenting, by said computing system to said user, a second list comprising peer group options associated with said process categories;

receiving, by said computing system from said user, a second selection of at least one peer group option from said second list;

retrieving, by said computing system, a portion of data from said data, said portion of data associated with said first selection and said second selection;

calculating, by said computing system, a plurality of values for attributes associated with said first selection and said second selection, said calculating based on said portion of data;

generating, by said computing system, a report comprising said plurality of values; and printing or displaying, by said computing system, said report.

The present invention advantageously provides a simple method and associated system capable of generating business related documents.

BRIEF DESCRIPTION OF THE DRAWINGS

FIGS. 3-9 illustrate examples of a computer screen shots associated with various steps in the algorithm of FIG. 2, in accordance with embodiments of the present invention.

DETAILED DESCRIPTION OF THE INVENTION

Figure 1:
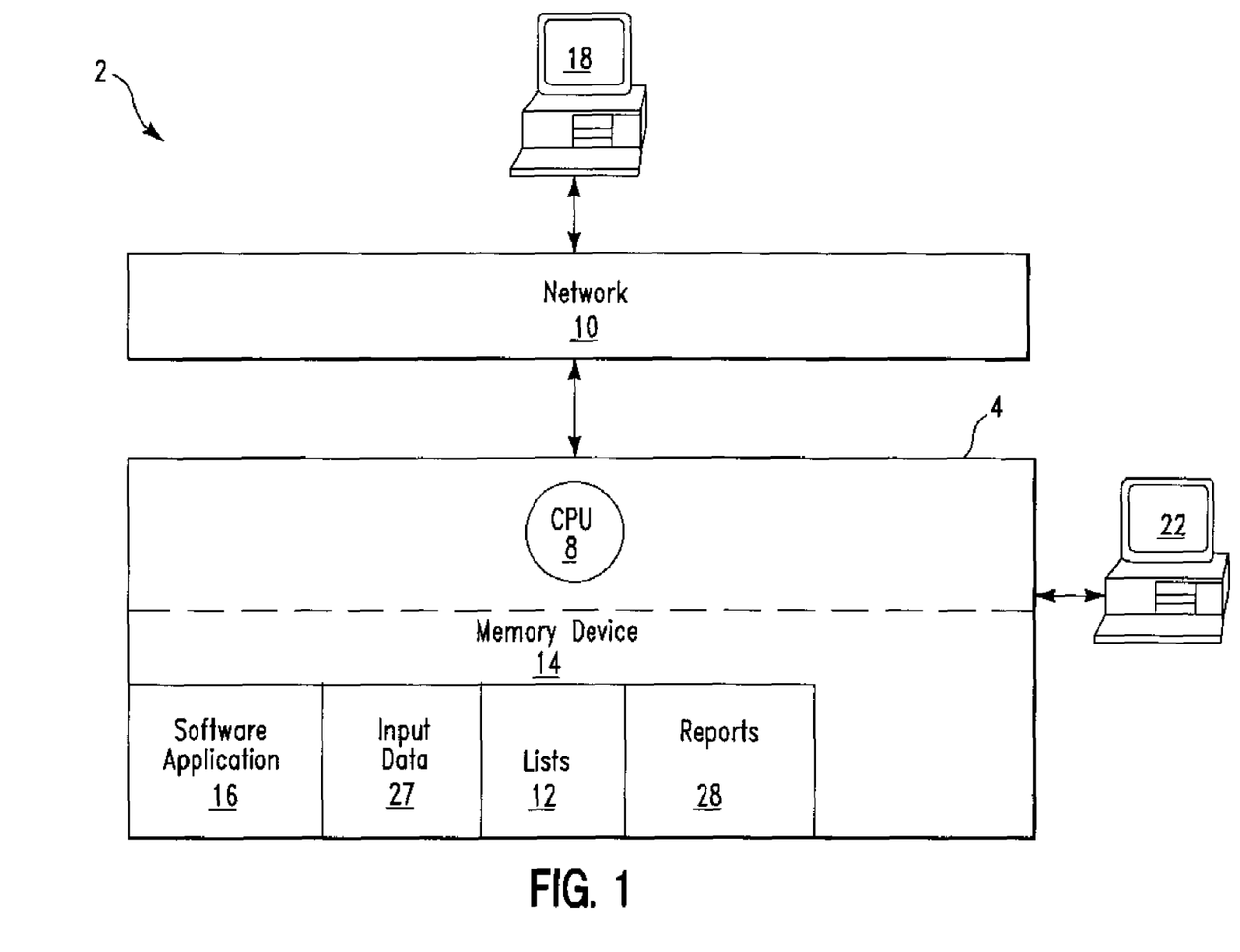
FIG. 1 illustrates a block diagram of a system for generating performance data reports 28 using input data, in accordance with embodiments of the present invention.

FIG. 1 illustrates a block diagram of a system 2 for generating performance data reports 28 using input data 27, in accordance with embodiments of the present invention. System 2 generates performance data reports 28 in real time on demand (i.e., immediately as requested). Each performance data report of performance data reports 28 comprises benchmark data (e.g., benchmark values, median values, etc) and qualitative data (e.g., business drivers, etc). Each performance data report may additionally comprise a process map. Each performance data report is associated with customizable peer groups within an entity (e.g., a business) and is aligned with a process framework. A process framework comprises an enterprise model of business processes. For example, a business process may comprise a process to appraise and develop suppliers (i.e., for perspective employees). A process framework comprises process categories (or functions), processes, and activities. Each process category may comprise more than one process. A process category may comprise a plurality of processes representing a general collection of business activities that share a common attribute or conceptual scheme. A process comprises a series of interrelated activities that convert inputs into results (i.e., outputs). Processes consume resources and require standards for repeatable performance. Additionally, processes respond to control systems that direct the quality, rate, and cost of performance. An activity comprises a series of transactions that translates inputs into outputs using resources in response to a business requirement. A process map comprises a flow diagram of process categories, processes, activities and tasks. Process maps provide a visual representation of what is involved in a process including inputs, outputs and interactions. A process map may be used to isolate processes and identify bottlenecks and other inefficiencies within a process framework. A business driver comprises an enabler of business process performance such as, inter alia, technology, organizational structure, culture, etc. Peer groups are defined herein as groupings of various components or portions (herein referred to sites) of a business or entity. Peer groups are configured based on rules applied to each site's answers to a single question. Depending upon the site's answer to the single question, it is assigned to a specified peer group bucket. For example, a peer group could comprise a geographical region. Each site would be grouped into associated buckets such as Region=Americas, Region=Europe, etc. Peer groups comprise a critical mass attribute that controls computation of peer group benchmarks. If a number of components in a given peer group bucket are not greater than the peer group's critical mass, then a benchmark can not be created for that peer group. Benchmark values and median values are calculated using measure values for a plurality of measures.

A measure is defined herein as a set of rules that are applied to answers in response to questions. Each measure comprises a formula specifying a question or combination of questions that are used to compute measure values for each measure. For example, a measure may comprise "Total cost of financial reporting per $1,000 revenue." This measure's formula would comprise:

(Personnel cost of financial reporting+systems cost of financial reporting+overhead cost of financial reporting+outsourced cost of financial reporting+ "other" cost of financial reporting)/total annual revenue.

Measures are typically normalized. Measures comprise a directional value that indicates better performance. For example, in a case of cost measures a lower value is preferable to a higher value and in a case of productivity measures a higher value is preferable to a lower value. Measure values are always numeric. A measure value operates on questions that are numerical, percentage, or currency (i.e., monetary) related.

Benchmark values and median values are constructed from a set of eligible measure values for each measure. For each measure, a median value is the 50th percentile of the set of measure values (i.e., a midpoint) and a benchmark value is the 80th percentile of the set of eligible measure values (i.e., a point at which 80% of the measure values are worse; and 20% are better).

System 2 comprises computing system 4, an input terminal 18, an input terminal 22, and a network 10. Network 10 may comprise any type of network known to one skilled in the art including, inter alia, a local area network, (LAN), a wide area network (WAN), the Internet, etc. Input terminal 18 may comprise any type of computing apparatus including, inter alia, a personal computer (PC), a laptop computer, a personal digital assistant (PDA), etc. Input terminal 22 may comprise any type of computing apparatus including, inter alia, a personal computer (PC), a laptop computer, a PDA, etc. Computing system 4 comprises a central processing unit (CPU) 8 and a memory device 14. The memory device 14 comprises a software application 16, input data 27, selection lists 12 associated with input data 27, and generated performance data reports 28. Input data 27 may comprise benchmark data (e.g., benchmark values, median values, etc) and qualitative data. Input data 27 may be entered into computing system 4 using input terminal 18 or input terminal 22. Input terminal 18 is connected to computing system 4 through network 10. Selection lists 12 comprises a plurality of lists that enables specified selections for the input data 27. Computing system 4 executes software application 16. Software application 16 uses selected (i.e., by a user and selected using one or more of lists 12) portions of data 27 to generate performance data reports 28. Performance data reports 28 comprise company benchmark values and median values computed in real time using measure value data (i.e., input data 27) from the memory device 14. Users may select portions of data from data 27 to create custom cuts of data (e.g., peer group benchmark values, peer group medians, peer group business drivers) on demand. In order to initiate a report generation process, a user may be required to log into computing system 4 (e.g., using terminal 18 or 22). Software application 16 allows the user to select a function which may be a process category or a process. For each selected function, software application 16 displays (e.g., on terminal 18 or 22) to the user all benchmark values, median values, and business driver values that have been configured for display for the associated function.

For each selected function, software application 16 will display to the user leading practice statements (i.e., a proven business method or application that has resulted in significant improvements in performance and may be applied across industry boundaries), supporting case in point studies, (i.e., a company specific reference to a leading practice statement that highlights how the company uses that practice and the associated benefits) and process models. Software application 16 will display a selection (e.g., a list) for peer group options configured for display based on the function selected. Software application 16 will allow a user to select one or multiple peer group options. Software application 16 will construct median and benchmark values based on the following rules:

1. The set of available measure values to be used in constructing a median/benchmark value should start with the intersection of all values associated with the selected function and peer groups.
2. The set should then be narrowed according to the measure value computation rules and measure value reporting rules.
3. The medians and benchmarks should be computed according to measure specific benchmark rules.

For each selected measure, software application 16 will display the measure description and the median values/benchmark values for the selected peer group intersection. Software application 16 will allow the user to select a currency to display benchmark values, median values and business driver values. The end result is a performance data report comprising the aforementioned information. Each performance data report is either displayed (e.g., using one of terminals 18 or 22) or printed (e.g., using a printer portion of one of terminals 18 or 22) for the user.

An example for implementation of software application 16 to generate a performance data report is described as follows:

A user would like to generate a performance data report for a procurement function. The user opens software application 16 and logs in. The user selects from a process category "Procure materials and services". Software application provides list of available processes for the selected process category and user selects "Order materials and services". Software application 16 displays for the user, peer group options such as industry, region, size, market conditions, strategy etc. The user selects the major industry "manufacturing" and region "Europe". The user selects the currency "Euro" to receive values. Software application 16 accesses an eligible set of measure values and business drivers and calculates and reports benchmark value, median value, and business driver values. Software application 16 provides a performance data report comprising leading practices for "procure materials and services" with relevant case in points. Additionally, the performance data report comprises process maps for "procure materials and services".

Figure 2:
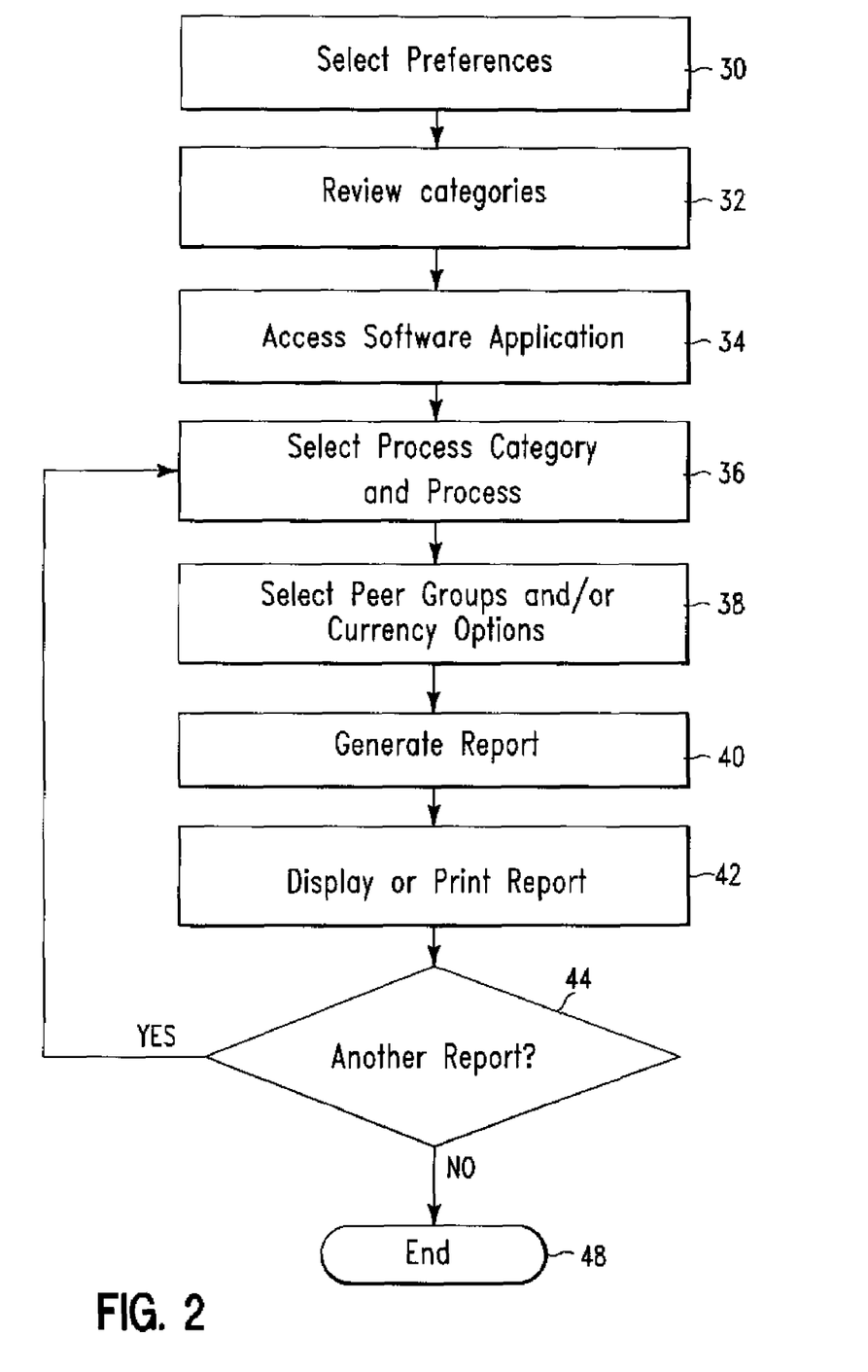
FIG. 2 illustrates a flowchart describing an algorithm used by the software application of FIG. 1 to generate performance data reports, in accordance with embodiments of the present invention.

FIG. 2 illustrates a flowchart describing an algorithm used by software application 18 in system 2 of FIG. 1 to generate performance data reports 28, in accordance with embodiments of the present invention. In step 30, preferences for a process framework are selected. In step 32, a user will review categories in the process framework of step 30 and select an area that is of interest for obtaining performance related data. For example, the user may select "4.2 Procure materials and services" (e.g., see screen shot in FIG. 3). In step 34, software application 16 is accessed and enabled. Software application may be web based and secured by id and password authentication. In step 36, the user select a process category (i.e., within software application 16) and in response software application 16 provides a selection of processes (i.e., from lists 12) based on the chosen process category. The user will select a process. Alternatively, the user may select a cross process category. In step 38, the user will select peer groups from available peer group options (i.e., from lists 12) to define a set of criteria matching their desires. Additionally, the user may elect to change a currency option for resulting performance data to appear. In step 40, software application 16, will apply the preferences selected by the user and preconfigured rules (e.g., measure value computation rules, measure reporting rules, measure specific benchmark rules) and generate a performance data report comprising benchmark measure values, median values, business drivers, leading practices, case in points, and process maps. In step 42, computing system 4 displays the performance data report (i.e., generated in step 40) for the user. The user may view or print (e.g., using terminal 18 or 22 of FIG. 1) the performance data report for measures, business drivers, leading practices and process maps. The performance data report displays benchmark values and median values for site specific instances (i.e. companies) matching all the criteria specified. The performance data report displays quantitative values based on qualitative data for site specific instances matching all the criteria specified. The user may also view leading practices and associated cases studies and process maps that are applicable to the selections. In step 44, the user is presented with a choice to generate another performance data report. If in step 44, the user chooses to generate another performance data report then step 36 is repeated. If in step 44, the user chooses not to generate another performance data report then in step 48 the process is terminated.

Figure 3:
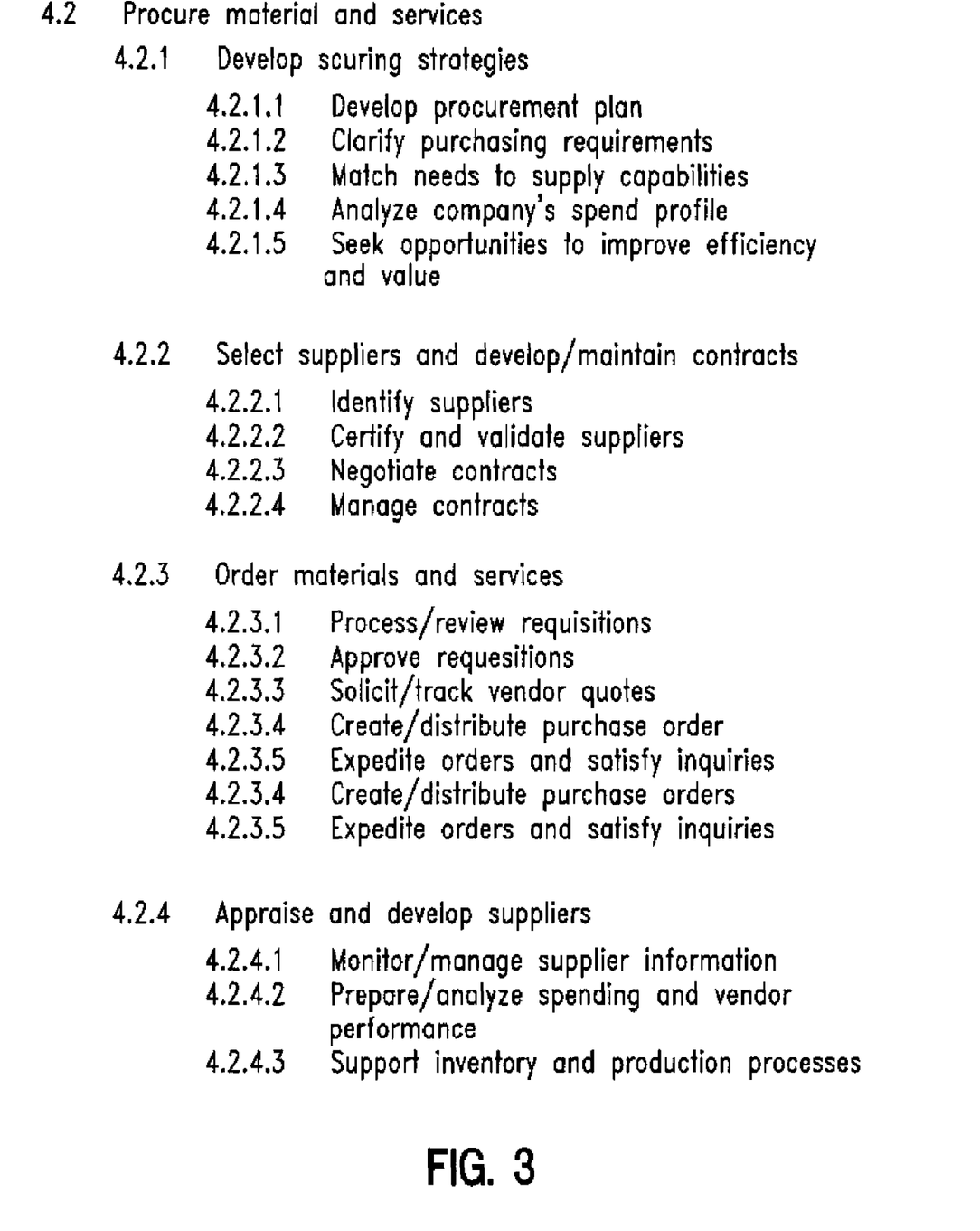

FIG. 3 illustrates an example of a pdf document displayed on a computer screen (e.g., displayed on terminal 18 or 22 of FIG. 1) associated with step 32 of FIG. 2, in accordance with embodiments of the present invention. The pdf document illustrated in FIG. 3 may be launched from the software application 16. The example illustrated in FIG. 3 is a framework for an open standard enterprise model of business processes. The model comprises categories, process groups, processes, activities, and tasks. A user would review the framework and select an area of interest. As described with reference to FIG. 1 in the example of implementation the user may select 4.2 "Procure materials and services".

Figure 4:
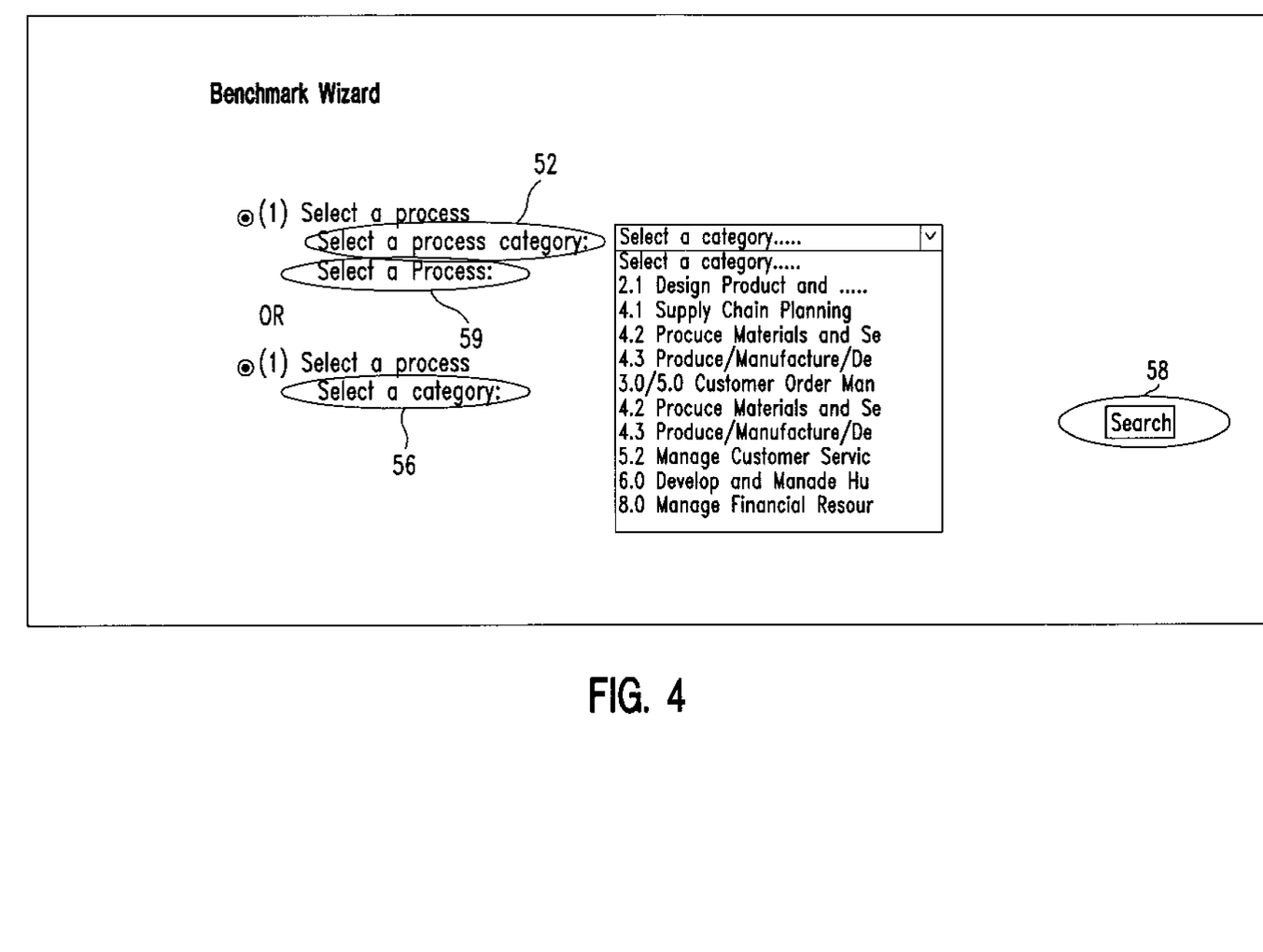

FIG. 4 illustrates an example of a computer screen shot (e.g., displayed on terminal 18 or 22 of FIG. 1) associated with step 36 of FIG. 2, in accordance with embodiments of the present invention. In FIG. 4, the user may select a process category 52 a process 54, and/or a cross process category 56. The computer screen shot illustrated in FIG. 4 is generated by software application 16. In FIG. 3 the user has selected "Procure materials and services". In FIG. 4, the user will select a process category 52 from the selection appearing in software application 16 which is based on the process classification framework. The user is given a choice to select a process 54. The process comprises a series of interrelated activities that convert inputs into results (outputs). Processes consume resources and require standards for repeatable performance. Processes respond to control systems that direct the quality, rate, and cost of performance. For example, Procure materials and services. The user has an option to select from a selection of options that contain performance data from preconfigured combinations of multiple process categories. After making selections, the user enables the search key 58 to search through input data 27 and retrieve related data.

Figure 5:
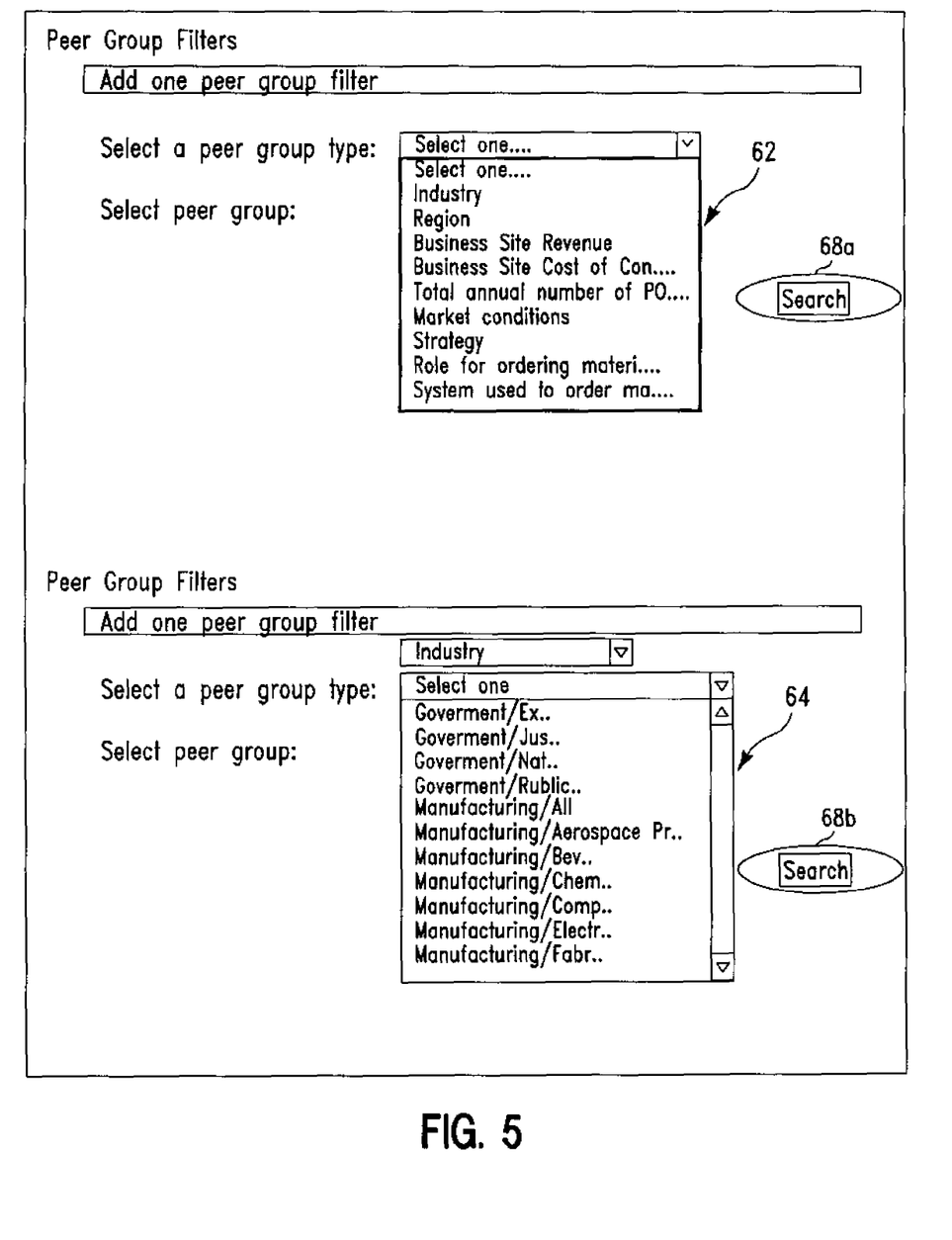

FIG. 5 illustrates an example of a computer screen shot (e.g., displayed on terminal 18 or 22 of FIG. 1) associated with step 38 of FIG. 2, in accordance with embodiments of the present invention. The computer screen shot illustrated in FIG. 5 is generated by software application 16. The computer screen shot illustrated in FIG. 5 may comprise multiple screen shots. In FIG. 5, the user may select from a list of possible peer group types 62. A peer group type is category of criteria to be applied to answers for the purposes of generating comparisons of performance data. Examples of peer group types may include, inter alia, industry, region, business strategy, organization structure, etc. In this screen the user selected has selected "industry" as the peer group type. Additionally, the user may select from a listing of peer groups 64 generated from software application 16 based on user selection of peer group type 62. Peer groups 64 are groupings of sites based on answers to selected questions. These groups are used in analysis. Peer groups are configured based on rules applied to each site's answers to a single question. For example, the user could select the peer group "Manufacturing/Food Manufacturing" under a peer group type "industry". To retrieve data associated with the selected peer group and peer group type, the user enables the search 68a and/or 68b feature to instruct software application 16 to apply the peer group type and peer group criteria selected in generating performance data findings. Peer groups comprise a critical mass attribute that controls computation of peer group benchmarks. If a number of sites in a given peer group bucket are not greater than the peer group's critical mass, then a benchmark can not be created for that peer group.

Figure 6:
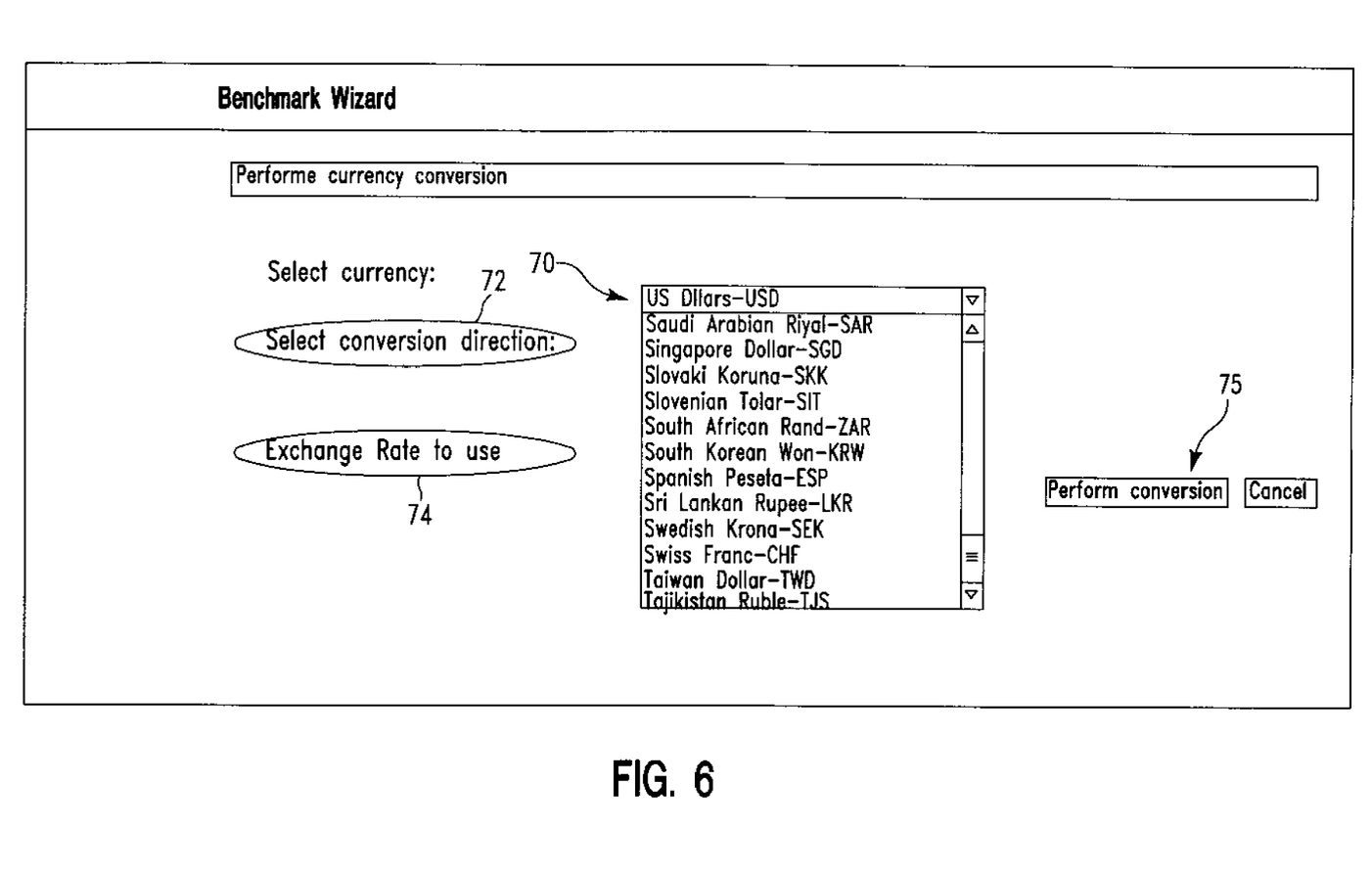

FIG. 6 illustrates an example of an additional computer screen shot (e.g., displayed on terminal 18 or 22 of FIG. 1) associated with step 38 of FIG. 2, in accordance with embodiments of the present invention. The computer screen shot illustrated in FIG. 6 is generated by software application 16. In FIG. 6, the user may select from a preconfigured list of currencies 70 in order to define what currency they want benchmark values, median values and qualitative business drivers to be delivered from software application 16. For example, the user may selects "Euro—EUR". The user will select form a preconfigured list, a direction of conversion 72 based on the exchange rate they are providing in exchange rate 74 to use. For example, the user selects "US Dollars to Foreign Currency". The user enters the exchange rate 74 to be applied to generate the currency selected based on the conversion direction selected 72. For example, the user enters "1.7" to represent 1.7 US Dollars=1 EUR. The user enables perform conversion 75 feature to instruct software application 16 to make the currency conversion based on their selections.

Figure 8:
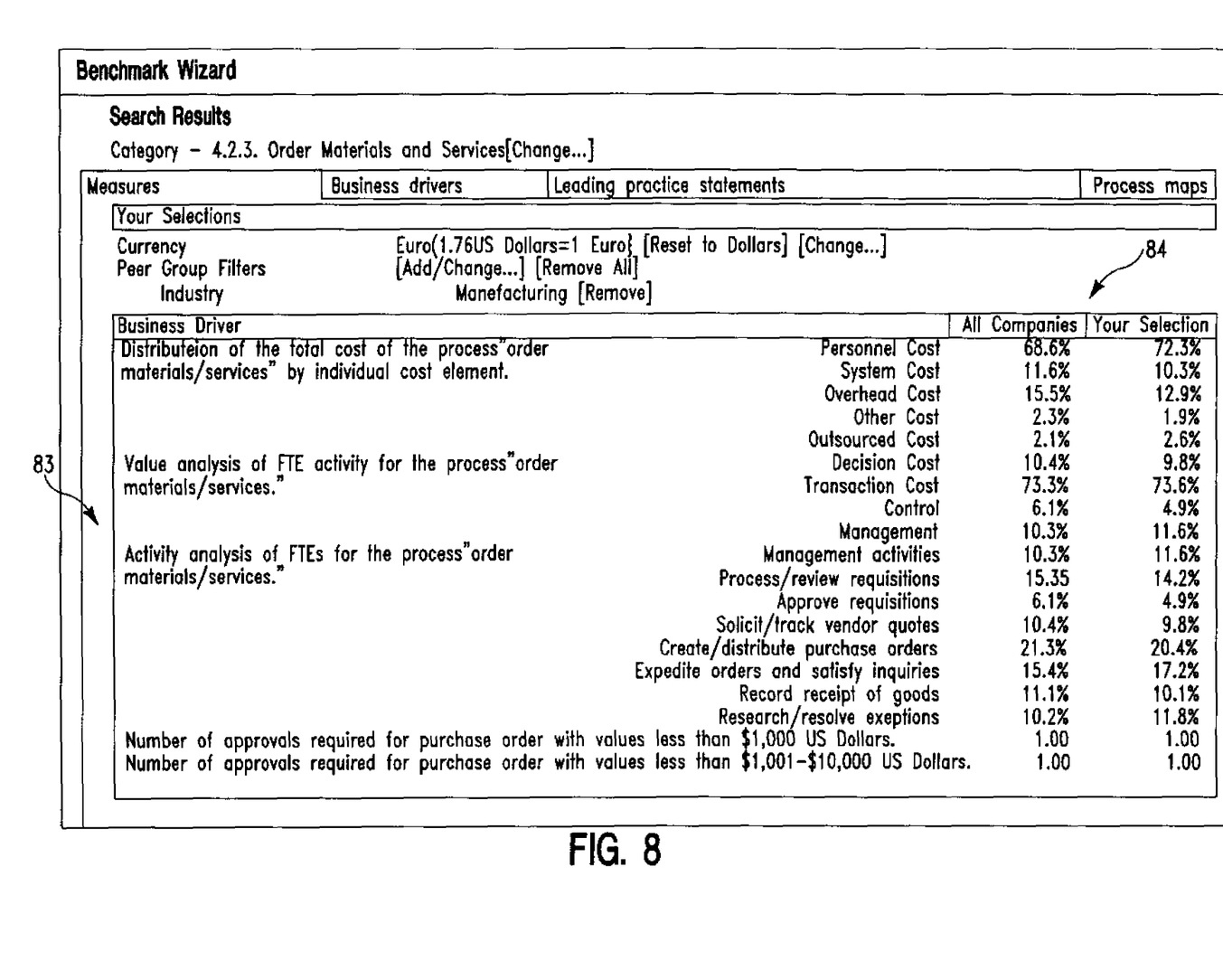

FIGS. 7-9 illustrate example of a computer screen shot (e.g., displayed on terminal 18 or 22 of FIG. 1) associated with step 42 of FIG. 2, in accordance with embodiments of the present invention. The screen shots (in combination) in FIGS. 7-9 illustrate performance data reports 28 of FIG. 1.

FIG. 7 illustrates an example of a computer screen shot (e.g., displayed on terminal 18 or 22 of FIG. 1) associated with step 42 of FIG. 2, in accordance with embodiments of the present invention. The computer screen shot illustrated in FIG. 7 is generated by software application 16. FIG. 7 illustrates a search results screen findings based on the process selected by the user in step 36 (i.e., of FIG. 2) and peer groups and/or currency options selected in step 38 (i.e., of FIG. 2). The selected category name appears on portion 77 of the screen. All findings in this screen are relevant to the selected process which in this example is the process "order materials and services". Multiple tabs 82 appear on the page including measure, business driver, leading practice statements, and process maps. Currency and peer group data 78 is provided for the user based on the process selected and applying the currency and peer group selected by the user. In this example, the user selected the currency option "Euro" and provided a "1.76 US Dollars-1 EUR" conversion rate. Additionally, the results apply only to those respondents (i.e., users) in the industry peer group "manufacturing". FIG. 7 illustrates the median value and benchmark value for each measure in the selected process and for the selected peer group and currency. For each measure, the median is the 50th percentile of the set of measure values (the midpoint), and the benchmark is the 80th percentile of the set of eligible measure values (the point at which 80% of the measure values are worse; and 20% are better).

FIG. 8 illustrates an example of an additional computer screen shot (e.g., displayed on terminal 18 or 22 of FIG. 1) associated with step 42 of FIG. 2, in accordance with embodiments of the present invention. The computer screen shot illustrated in FIG. 8 is generated by software application 16. In FIG. 8, the user retrieves business driver data 83. A business driver represents an enabler of business process performance such as technology, organizational structure, culture, etc. In certain database applications, a business driver is a set of rules that are applied to specified business driver answers to compute a business driver value. Search results 84 illustrates the business driver value for each business driver in the selected process and for the selected peer group and currency. Business driver values are computed using business driver rules.

FIG. 9 illustrates an example of an additional computer screen shot (e.g., displayed on terminal 18 or 22 of FIG. 1) associated with step 42 of FIG. 2, in accordance with embodiments of the present invention. The computer screen shot illustrated in FIG. 9 is generated by software application 16. In FIG. 9, the user retrieves leading practice statements 85. The user may view leading practice statements 85 associated with the category selected. A leading practice statement represents a proven business method or application that has resulted in significant improvements in performance and may be applied across industry boundaries. The user may additionally view case studies/case in point data 86. These are company specific references to a leading practice statement that highlights how the company uses that practice and the associated benefits. Case studies appear for each leading practice statement in the search result view. A user may click (e.g., using a computer mouse) on a leading practice statement and it will display all associated case studies within that same search view. Process maps 87 may be viewed In the search results view. The user may access process maps for the selected category. Process maps are flow diagrams of process categories, processes, activities and tasks. Process maps provide a visual representation of what is involved in a process including inputs, outputs, and interactions.

Figure 10:
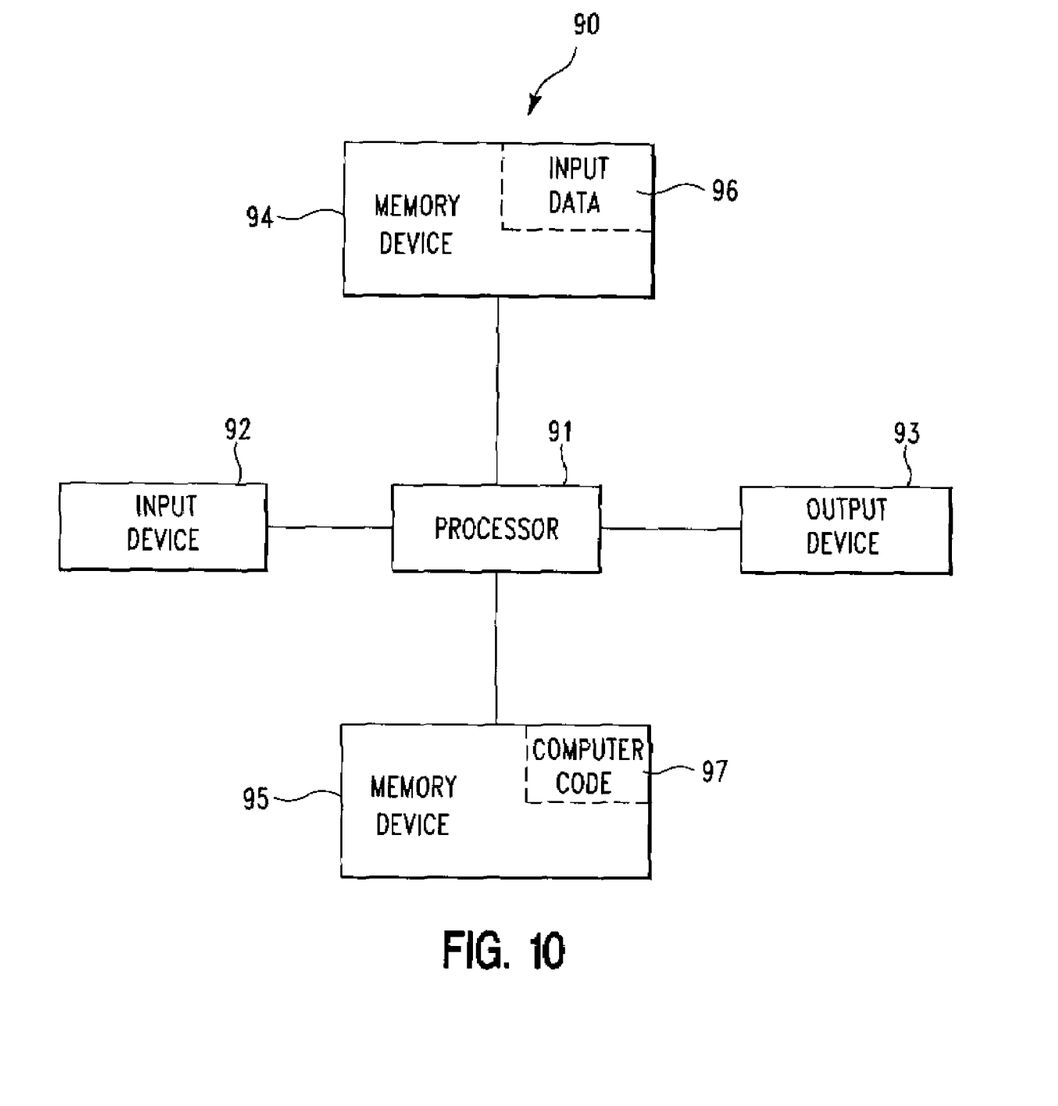
FIG. 10 illustrates a computer system used for generating performance data reports, in accordance with embodiments of the present invention.

FIG. 10 illustrates a computer system 90 (i.e., computing system 4 in FIG. 1) used for generating performance data reports 28, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm (e.g., algorithm of FIG. 2) for generating performance data reports 28. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 10) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to provide a service for generating performance data reports 28. Thus the present invention discloses a process for deploying or integrating computing infrastructure, comprising integrating computer-readable code into the computer system 90, wherein the code in combination with the computer system 90 is capable of performing a method for generating performance data reports 28. In another embodiment, the invention provides a business method that performs the process steps of the invention on a subscription, advertising, and/or fee basis. That is, a service provider, such as a Solution Integrator, could offer to generate performance data reports 28. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A report generation method within a computing system, said computing system comprising a memory device, said memory device comprising data, said method comprising:
presenting, by said computing system to a user of said computing system, a first list comprising process categories for a plurality of processes;
receiving, by said computing system from said user, a first selection of a process category from said first list;
presenting, by said computing system to said user, a user peer selection interface comprising a second list comprising first peer group options associated with said process categories and an additional list comprising additional peer group options associated with a selection of said first peer group options, wherein said first peer group options comprise options associated with a specified industry, a specified region, a role for ordering materials, a system for ordering materials, and current market conditions, and wherein said additional peer group options comprise options associated with government types and manufacturing types;
receiving, by said computing system from said user, a second selection of at least one peer group option from said first peer group options of said second list;
receiving, by said computing system from said user based on said second selection, an additional selection of at least one peer group option from said additional peer group options of said additional list;
retrieving, by said computing system, a portion of data from said data, said portion of data associated with said first selection, said second selection, and said additional selection;
calculating, by said computing system, a plurality of values for attributes associated with said first selection, said second selection, and said additional selection, said calculating based on said portion of data, said calculating said plurality of values comprising calculating: benchmark values, median values, and business driver values associated with said first selection, said second selection, and said additional selection;
presenting, by said computing system to said user via a benchmark wizard interface, a plurality of currency selections and associated exchange rates;
receiving, by said computing system from said user in response to said presenting said plurality of currency selections and said associated exchange rates, a specified currency selection and exchange rate for displaying said benchmark values and said median values;
receiving, by said computing system from said user in response to said presenting said plurality of currency selections and said associated exchange rates, a specified conversion direction associated with said specified currency selection and exchange rate;
changing, by said computing system in response to said specified currency selection and exchange rate and said specified conversion direction, a first currency association for said benchmark values and said median values to a second currency association for said benchmark values and said median values;
generating, by said computing system, a report comprising said plurality of values, wherein said report comprises a first portion, a second portion, and a third portion, wherein said first portion comprises said benchmark values and said median values listed in association with said specified currency selection, wherein said first portion comprises a cost measures section, a cycle time measures section, and an efficiency and quality measures section, wherein said second portion comprises costs associated with said business driver values, and wherein said third portion comprises leading practice statements and case studies; and
independently printing or displaying, by said computing system, said first portion, said second portion, and said third portion of said report.

2. The method of claim 1, wherein said portion of data comprises measure values and business drivers associated with said first selection and said second selection.

3. The method of claim 1, wherein said report comprises leading practices and process maps associated with said first selection and said second selection.

4. The method of claim 1, wherein said calculating is performed on demand after said first selection and said second selection.

5. The method of claim 1, further comprising:
presenting, by said computing system to said user, a third list comprising currency options associated with said process categories;
receiving, by said computing system from said user, a third selection for at least one currency option from said third list, wherein said portion of data is further associated with said third selection, and wherein said calculating said plurality of values comprises calculating values for attributes associated with said third selection.

6. The method of claim 1, further comprising:
providing at least one support service for at least one of creating, integrating, hosting, maintaining, and deploying computer-readable code in said computing system, wherein the code in combination with the computing system is capable of performing: said presenting said first list, said receiving said first selection, said presenting said user peer selection interface, said receiving said second selection, said receiving said additional selection, said retrieving, said calculating said plurality of values, said presenting said plurality of currency selections, said receiving said specified currency selection, said receiving said specified conversion direction, said changing, said generating said report, and said independently printing or displaying.

7. A computing system comprising a processor coupled to a computer-readable memory unit, said memory unit comprising data and instructions that when executed by the processor implement a report generation method, said method comprising:
presenting, by said computing system to a user of said computing system, a first list comprising process categories for a plurality of processes;
receiving, by said computing system from said user, a first selection of a process category from said first list;
presenting, by said computing system to said user, a user peer selection interface comprising a second list comprising first peer group options associated with said process categories and an additional list comprising additional peer group options associated with a selection of said first peer group options, wherein said first peer group options comprise options associated with a specified industry, a specified region, a role for ordering materials, a system for ordering materials, and current market conditions, and wherein said additional peer group options comprise options associated with government types and manufacturing types;
receiving, by said computing system from said user, a second selection of at least one peer group option from said first peer group options of said second list;
receiving, by said computing system from said user based on said second selection, an additional selection of at least one peer group option from said additional peer group options of said additional list;
retrieving, by said computing system, a portion of data from said data, said portion of data associated with said first selection, said second selection, and said additional selection;
calculating, by said computing system, a plurality of values for attributes associated with said first selection, said second selection, and said additional selection, said calculating based on said portion of data, said calculating said plurality of values comprising calculating: benchmark values, median values, and business driver values associated with said first selection, said second selection, and said additional selection;

presenting, by said computing system to said user via a benchmark wizard interface, a plurality of currency selections and associated exchange rates;
receiving, by said computing system from said user in response to said presenting said plurality of currency selections and said associated exchange rates, a specified currency selection and exchange rate for displaying said benchmark values and said median values;
receiving, by said computing system from said user in response to said presenting said plurality of currency selections and said associated exchange rates, a specified conversion direction associated with said specified currency selection and exchange rate;
changing, by said computing system in response to said specified currency selection and exchange rate and said specified conversion direction, a first currency association for said benchmark values and said median values to a second currency association for said benchmark values and said median values;
generating, by said computing system, a report comprising said plurality of values, wherein said report comprises a first portion, a second portion, and a third portion, wherein said first portion comprises said benchmark values and said median values listed in association with said specified currency selection, wherein said first portion comprises a cost measures section, a cycle time measures section, and an efficiency and quality measures section, wherein said second portion comprises costs associated with said business driver values, and wherein said third portion comprises leading practice statements and case studies; and
independently printing or displaying, by said computing system, said first portion, said second portion, and said third portion of said report.

8. The computing system of claim 7, wherein said portion of data comprises measure values and business drivers associated with said first selection and said second selection.

9. The computing system of claim 7, wherein said report comprises leading practices and process maps associated with said first selection and said second selection.

10. The computing system of claim 7, wherein said calculating is performed on demand after said first selection and said second selection.

11. The computing system of claim 7, wherein said method further comprises:
presenting, by said computing system to said user, a third list comprising currency options associated with said process categories;
receiving, by said computing system from said user, a third selection for at least one currency option from said third list, wherein said portion of data is further associated with said third selection, and wherein said calculating said plurality of values comprises calculating values for attributes associated with said third selection.

12. A computer program product, comprising a tangible computer readable storage device comprising a computer readable program code embodied therein, said computer readable program code comprising an algorithm adapted to implement a report generation method within a computing system, said computing system comprising data, said method comprising:
presenting, by said computing system to a user of said computing system, a first list comprising process categories for a plurality of processes;
receiving, by said computing system from said user, a first selection of a process category from said first list;

presenting, by said computing system to said user, a user peer selection interface comprising a second list comprising first peer group options associated with said process categories and an additional list comprising additional peer group options associated with a selection of said first peer group options, wherein said first peer group options comprise options associated with a specified industry, a specified region, a role for ordering materials, a system for ordering materials, and current market conditions, and wherein said additional peer group options comprise options associated with government types and manufacturing types;

receiving, by said computing system from said user, a second selection of at least one peer group option from said first peer group options of said second list;

receiving, by said computing system from said user based on said second selection, an additional selection of at least one peer group option from said additional peer group options of said additional list;

retrieving, by said computing system, a portion of data from said data, said portion of data associated with said first selection, said second selection, and said additional selection;

calculating, by said computing system, a plurality of values for attributes associated with said first selection, said second selection, and said additional selection, said calculating based on said portion of data, said calculating said plurality of values comprising calculating: benchmark values, median values, and business driver values associated with said first selection, said second selection, and said additional selection;

presenting, by said computing system to said user via a benchmark wizard interface, a plurality of currency selections and associated exchange rates;

receiving, by said computing system from said user in response to said presenting said plurality of currency selections and said associated exchange rates, a specified currency selection and exchange rate for displaying said benchmark values and said median values;

receiving, by said computing system from said user in response to said presenting said plurality of currency selections and said associated exchange rates, a specified conversion direction associated with said specified currency selection and exchange rate;

changing, by said computing system in response to said specified currency selection and exchange rate and said specified conversion direction, a first currency association for said benchmark values and said median values to a second currency association for said benchmark values and said median values;

generating, by said computing system, a report comprising said plurality of values, wherein said report comprises a first portion, a second portion, and a third portion, wherein said first portion comprises said benchmark values and said median values listed in association with said specified currency selection, wherein said first portion comprises a cost measures section, a cycle time measures section, and an efficiency and quality measures section, wherein said second portion comprises costs associated with said business driver values, and wherein said third portion comprises leading practice statements and case studies; and independently printing or displaying, by said computing system, said first portion, said second portion, and said third portion of said report.

13. The computer program product of claim 12, wherein said portion of data comprises measure values and business drivers associated with said first selection and said second selection.

14. The computer program product of claim 12, wherein said report comprises leading practices and process maps associated with said first selection and said second selection.

15. The computer program product of claim 12, wherein said calculating is performed on demand after said first selection and said second selection.

16. The computer program product of claim 12, wherein said method further comprises:

presenting, by said computing system to said user, a third list comprising currency options associated with said process categories;

receiving, by said computing system from said user, a third selection for at least one currency option from said third list, wherein said portion of data is further associated with said third selection, and wherein said calculating said plurality of values comprises calculating values for attributes associated with said third selection.

* * * * *